(12) United States Patent
Shinkuma

(10) Patent No.: US 12,341,759 B2
(45) Date of Patent: Jun. 24, 2025

(54) BLOCKCHAIN NETWORK SYSTEM

(71) Applicant: Kyoto University, Kyoto (JP)

(72) Inventor: Ryoichi Shinkuma, Kyoto (JP)

(73) Assignee: Kyoto University, Kyoto (JP)

( * ) Notice: Subject to any disclaimer, the term of this patent is extended or adjusted under 35 U.S.C. 154(b) by 267 days.

(21) Appl. No.: 17/916,428

(22) PCT Filed: Mar. 8, 2021

(86) PCT No.: PCT/JP2021/009019
§ 371 (c)(1),
(2) Date: Sep. 30, 2022

(87) PCT Pub. No.: WO2021/199938
PCT Pub. Date: Oct. 7, 2021

(65) Prior Publication Data
US 2023/0155987 A1     May 18, 2023

(30) Foreign Application Priority Data
Apr. 3, 2020 (JP) .................................. 2020-067697

(51) Int. Cl.
*H04L 29/00* (2006.01)
*G06N 20/00* (2019.01)
(Continued)

(52) U.S. Cl.
CPC ......... *H04L 63/0457* (2013.01); *G06N 20/00* (2019.01); *H04L 9/50* (2022.05); *H04L 63/123* (2013.01)

(58) Field of Classification Search
CPC ..... H04L 63/0457; H04L 9/50; H04L 63/123; H04L 9/0894; G06N 20/00; G06F 21/6209; G06F 21/64
See application file for complete search history.

(56) References Cited

U.S. PATENT DOCUMENTS 6,674,477 B1 * 1/2004 Yamaguchi ............ H04N 19/50
                                                                375/E7.113
11,100,197 B1 * 8/2021 Bernardi .................... H04L 9/14
(Continued)

FOREIGN PATENT DOCUMENTS

CN    105718861 A  *  6/2016
CN    111274578 A  *  6/2020  ............ G06F 21/55
(Continued)

OTHER PUBLICATIONS

International Search Report PCT/JP2021/009019 dated Jun. 1, 2022 (pp. 1-4).
(Continued)

*Primary Examiner* — Don G Zhao
(74) *Attorney, Agent, or Firm* — Millen, White, Zelano & Branigan P.C.; William F. Nixon (57) ABSTRACT

A blockchain network system includes a plurality of sensor devices and a blockchain network. The sensor devices are communicably connected with each other via the blockchain network, and sensor data acquired by the sensor devices is managed on the blockchain network in a distributed manner. The sensor device includes a sensor unit for sequentially acquiring sensor data in real space on a frame-by-frame basis, a data processing unit for processing the sensor data, a data storage unit for storing the sensor data, an encryption unit for encrypting the sensor data, and a registration unit for registering the sensor data encrypted by the encryption unit on the BC network. The data processing unit aggregates the sensor data with a predetermined number of frame aggregations. The encryption unit collectively encrypts the sensor data aggregated by the data processing unit with the predetermined number of frame aggregations.

9 Claims, 10 Drawing Sheets

(51) Int. Cl.
  *H04L 9/00* (2022.01)
  *H04L 9/40* (2022.01)

(56) References Cited

U.S. PATENT DOCUMENTS

| | | | |
|---|---|---|---|
| 11,212,671 B2* | 12/2021 | Hutchison | H04W 4/38 |
| 12,088,541 B1* | 9/2024 | Kheit | H04L 51/046 |
| 2009/0119510 A1* | 5/2009 | Long | H04L 9/3242 713/171 |
| 2011/0170687 A1* | 7/2011 | Hyodo | H04L 9/0637 380/200 |
| 2013/0129079 A1* | 5/2013 | Swaminathan | H04L 9/0637 380/28 |
| 2013/0129085 A1* | 5/2013 | Swaminathan | H04L 9/0637 380/42 |
| 2013/0232339 A1* | 9/2013 | Ignatchenko | H04N 21/2347 713/171 |
| 2014/0226814 A1* | 8/2014 | Fernando | H04N 21/2347 380/200 |
| 2016/0142746 A1* | 5/2016 | Schuberth | H04N 21/236 725/31 |
| 2017/0046669 A1 | 2/2017 | Chow et al. | |
| 2018/0307859 A1* | 10/2018 | LaFever | H04L 63/20 |
| 2019/0045207 A1* | 2/2019 | Chen | G06N 3/045 |
| 2019/0251470 A1 | 8/2019 | Sika | |
| 2019/0303853 A1* | 10/2019 | Cantrell | H04L 9/0825 |
| 2019/0310137 A1 | 10/2019 | Pop | |
| 2019/0325227 A1* | 10/2019 | Smith | H04N 21/631 |
| 2019/0332931 A1 | 10/2019 | Montantes | |
| 2020/0036514 A1 | 1/2020 | Christensen et al. | |
| 2020/0092113 A1* | 3/2020 | Hutchison | H04L 9/3263 |
| 2020/0099531 A1* | 3/2020 | Chidambaram | G06Q 50/18 |
| 2020/0311666 A1* | 10/2020 | Gray | G06Q 30/0283 |
| 2021/0014565 A1* | 1/2021 | Zamudio | H04N 21/4516 |
| 2021/0390533 A1* | 12/2021 | Fan | G06Q 20/3825 |
| 2022/0169401 A1* | 6/2022 | Di Cosola | B64U 70/95 |
| 2022/0189172 A1* | 6/2022 | Han | H04L 9/3297 |
| 2022/0271930 A1* | 8/2022 | Takatsuka | G06F 7/588 |

FOREIGN PATENT DOCUMENTS

| | | |
|---|---|---|
| CN | 111339943 A * | 6/2020 |
| JP | 2013239115 A | 11/2013 |
| JP | 2019074956 A | 5/2019 |
| JP | 2019153130 A | 9/2019 |
| JP | 2019192207 A | 10/2019 |

OTHER PUBLICATIONS

European Search Report dated Mar. 5, 2024, issued in corresponding application EP 21 77 9033.

* cited by examiner

BLOCKCHAIN NETWORK SYSTEM

TECHNICAL FIELD

The present invention relates to a blockchain network system in which a plurality of sensor devices is connected with each other by a blockchain network in a communicable manner, and sensor data acquired by the sensor devices is managed on the blockchain network in a distributed manner.

BACKGROUND OF THE INVENTION

The use of transportation and consumption are generated according to people's movements, thereby causing economic revitalization. On the other hand, the movements cause risks, such as, e.g., traffic accidents, crime involvement, and viral infections. For this reason, in the concept of a future smart city, it is required to guarantee the safety of the movements by smart monitoring.

This smart monitoring is realized by a centrally managed sensor network infrastructure in which a large number of sensors interconnected by a dispersive network collect sensor data, and a server computer aggregates and processes the sensor data. This makes it possible to predictively detect risks, such as, e.g., accidents, crimes, and viral infections.

As a sensor network-based sensor for smart monitoring, a two-dimensional image sensor, such as, e.g., a camera, and a three-dimensional image sensor, such as, e.g., a LIDAR (Light Detection and Ranging), and the like are advantageously used to detect persons and vehicles.

However, in the case of the centrally managed sensor network infrastructure, there are following three problems.
(1) Protection of privacy information, such as, e.g., people's faces and license plates
(2) Robustness against unauthorized access, such as, e.g., tampering
(3) Protection of rights of sensor data, processed data, and analytical models Recently, a P2P network type blockchain network has attracted attention. This blockchain network is configured to manage data by a plurality of terminal devices arranged on a network in a dispersed manner.

More specifically, the data to be managed by the blockchain network has been managed in the history of all of registrations and changes, after starting the operation of the blockchain network, and anyone can browse the history. The history of the data managed by a blockchain network is grouped together as a transaction, and this transaction is called a block. Blocks are arranged in series, and when a newly connected block is correct, it is connected to the chain. Generally, a blockchain network system can be used anywhere in the world by simply installing software if it participates in a network.

By using this blockchain network, it is conceivable that the problems of the centrally managed sensor network infrastructure can be solved as described in (1) to (3) below.
(1) an access authorization to the data can be limited
(2) a protective function against unauthorized access using a one-way hash function is available
(3) The history of all of past registrations, changes, etc., of the data can be managed as a blockchain

PRIOR ART DOCUMENT

Non-Patent Document

Non-Patent Document 1: Fernandez-Carames, T. M., and Fraga-Lamas, P. "A Review on the Use of Blockchain for the Internet of Things, "IEEE Access, 6, 32979-33001, 2018.

Non-Patent Document 2: Jeong, Y., Hwang, D., and Kim, K. H., "Blockchain-Based Management of Video Surveillance Systems," IEEE International Conference on Information Networking (ICOIN), pp. 465-468, 2019.

SUMMARY OF THE INVENTION

Problems to be Solved by the Invention

However, a blockchain network usually simulates data on human transactions (at seconds intervals even quickly). For this reason, it took a certain registration requirement time (for example, 3.7 seconds on average) to complete the registration of data transaction.

In contrast, sensor data on a sensor network infrastructure is stream data in a video format or the like. Therefore, when it is attempted to register the sensor data on a blockchain network on a frame-by-frame basis, the registration interval will be on the order of milliseconds.

For this reason, in a blockchain network, it requires a certain requirement time (e.g., 3.7 seconds on average) for a single registration of sensor data. Therefore, when it is attempted to frequently register sensor data on a frame-by-frame basis, the blockchain network overflows. In order to avoid such overflow, it is conceivable to register one frame of sensor data for each certain registration requirement time (for example, 3.7 seconds on average). However, in this case, there is a problem that large data loss occurs.

The present invention has been made in view of the above-described problems. An object of the present invention is to provide a blockchain network system capable of preventing or reducing overflow or data loss of sensor data when managing sensor data acquired by sensors on a blockchain network in a distributed manner.

Means for Solving the Problem

In order to attain the above-described objects, the present invention provides a blockchain network system. The blockchain network system includes:
a plurality of sensor devices; and
a blockchain network,
wherein the plurality of sensor devices is connected with each other via the blockchain network in a communicable manner, and sensor data acquired by the sensor devices is managed on the blockchain network in a distributed manner,
wherein the sensor device includes:
a sensor unit configured to sequentially acquire sensor data in real space on a frame-by-frame basis;
a data processing unit configured to process the sensor data acquired by the sensor unit;
a data storage unit configured to store the sensor data acquired by the sensor unit;
an encryption unit configured to encrypt the sensor data obtained by the sensor unit; and
a registration unit configured to register the sensor data encrypted by the encryption unit on the blockchain network,
wherein the data processing unit aggregates the sensor data acquired by the sensor unit with a predetermined number of frame aggregations, and
wherein the encryption unit collectively encrypts the sensor data aggregated by the data processing unit with the predetermined number of frame aggregations.

It may be configured such that the encryption unit encrypts the sensor data acquired by the sensor unit on a frame-by-frame basis and then collectively encrypts the encrypted sensor data with the predetermined number of frame aggregations.

It may be configured such that the data processing unit aggregates the sensor data with a number of frame aggregations satisfying a following Formula [1].

$$T_F \times N > T \quad [1]$$

$T_F$: Frame interval of sensor data
N: Number of frame aggregations
T: Registration requirement time of sensor data in the blockchain network system Further, it may be configured such that the blockchain network system further includes:
a server device connected to the blockchain network in a communicable manner,
wherein the server device includes:
a server reception unit configured to receive the sensor data transmitted from each sensor device via the network;
a learning unit configured to generate a feature model of the sensor data based on the sensor data received by the server reception unit; and
an importance determination unit configured to determine importance of the sensor data, based on the feature model generated by the learning unit,
wherein in the sensor device, the data processing unit sets a predetermined number of frame aggregations of the sensor data, based on the importance of the sensor data determined by the importance determination unit of the server device, for the sensor data acquired by the sensor unit.

It may be configured such that the data processing unit sets the number of frame aggregations of the sensor data with high importance to be small and sets the number of frame aggregations of the sensor data with low importance to be large, based on the importance of the sensor data determined by the importance determination unit of the server device, for the sensor data acquired by the sensor unit.

It may be configured such that the data processing unit aggregates the sensor data by an average value of the number of frame aggregations represented by a following Formula [2].

$$N = N_H \times W_H + N_L \times W_L \quad [2]$$

N: Average value of the number of frame aggregations
$N_H$: Number of frame aggregations for sensor data with high importance
$W_H$: Ratio of sensor data with high importance to all sensor data
$N_L$: Number of frame aggregations of sensor data with low importance
$W_L$: Rate of sensor data with low importance to all sensor data It may be configured such that
the server device is provided with a server verification unit configured to verify the sensor data received by the server reception unit by referring to the blockchain network for each number of frame aggregations, and
the learning unit generates a feature model of the sensor data based on the sensor data received by the server reception unit in a case where it is verified by the server verification unit that the sensor data is appropriate.

It may be configured such that the blockchain network system further includes:
a user terminal device connected to the blockchain network,
wherein the user terminal device includes:
a user reception unit configured to receive sensor data transmitted from the server device;
a user verification unit configured to verify the sensor data received by the user reception unit by referring to the blockchain network for each number of frame aggregations; and
an output unit configured to output the sensor data in a case where it is verified by the user verification unit that the sensor data is appropriate.

It may be configured such that
the server device is provided with a surveillance unit for surveilling the sensor data received by the server reception unit, based on the feature model generated by the learning unit, and
the surveillance unit notifies the user terminal device of a predetermined abnormality or change in a case where the predetermined abnormality or change is detected in the sensor data received by the server reception unit.

Effects of the Invention

According to the present invention, it is possible to prevent or reduce overflow and/or data loss of sensor data when the sensor data acquired by the sensors is managed on the blockchain network in a distributed manner. Therefore, it is possible to protect privacy information, improve the robustness against unauthorized access, and protect the rights of the sensor data, the processed data, and the analytical models in the sensor network infrastructure in real space.

EMBODIMENTS FOR CARRYING OUT THE INVENTION

First Embodiment

Next, a first embodiment of a blockchain network system (hereinafter referred to as "this system") according to the present invention will be described with reference to FIG. 1 to FIG. 4.

Overall Configuration

Figure 1:
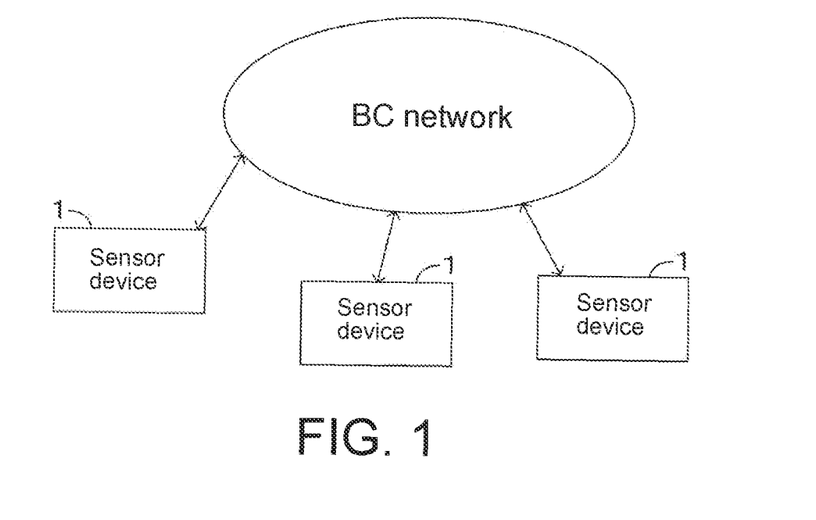
FIG. 1 is a schematic configuration diagram of a blockchain network system according to a first embodiment of the present invention.

In this system, as shown in FIG. 1, a plurality of sensor devices 1 is connected with each other in a communicable manner via a blockchain network (hereinafter referred to as "BC network"). The sensor data acquired by the sensor device 1 is managed in a distributed manner on the blockchain network. Note that in FIG. 1, although three sensor devices 1 are illustrated, another number of sensor devices 1 may be connected.

The sensor data is exemplified by any data that can be acquired by a sensor in real space, such as, e.g., weather data related to a rainfall amount, a snow accumulation, a wind direction, a wind speed, a wave height, etc., seismic data related to geothermal heat, ground components, etc., earthquake data related to earthquake intensity, etc., in addition to image data of a still image and a moving image, audio data, and multimedia data composed of a mixture of a moving image, a still image, and/or audio.

Further, in the BC network, the history of registrations, changes, etc., of all of sensor data has been managed since the start of operation of the BC network, and anyone can browse the history. The history of the sensor data managed by the BC network is grouped together as a transaction, and this transaction is called "block." Blocks are arranged in series, and if a newly connected block is correct, it will be connected to the chain. Generally, a BC network system can be used anywhere in the world by simply installing software when it participates in the network.

Configuration of Sensor Device 1

Figure 2:
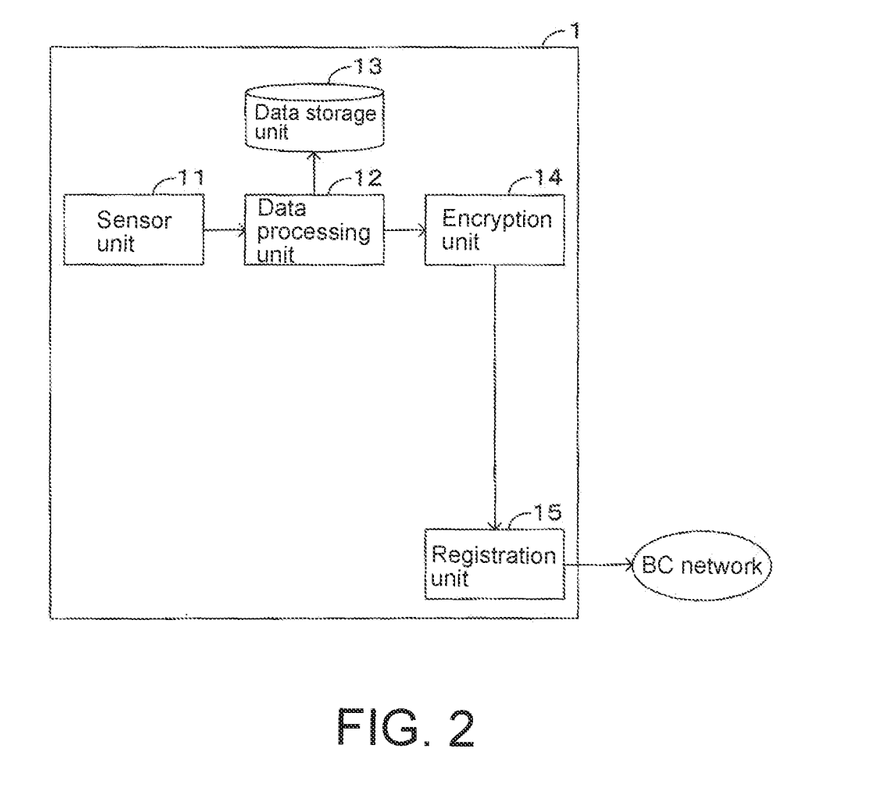
FIG. 2 is a block diagram showing a configuration of a sensor device shown in FIG. 1.

As shown in FIG. 2, the sensor device 1 is provided with a sensor unit 11 for acquiring sensor data in real space, a data processing unit 12 for processing the sensor data, a data storage unit 13 for storing the sensor data, an encryption unit 14 for encrypting the sensor data, and a registration unit 15 for registering the sensor data on the BC network.

The sensor unit 11 is, for example, a two-dimensional image sensor, such as, e.g., a camera, or a three-dimensional image sensor, such as, e.g., a LIDAR (Light Detection and Ranging). The sensor unit 11 sequentially acquires sensor data, such as, e.g., image data in real space, at predetermined intervals (e.g., 50 ms) on a frame-by-frame basis.

The data processing unit 12 makes the data storage unit 13 store the sensor data acquired by the sensor unit 11 and aggregates the sensor data acquired by the sensor unit 11 with a predetermined number of frame aggregations. The aggregation method of the sensor data according to this embodiment will be described later.

The data storage unit 13 stores the sensor data acquired by the sensor unit 11 according to the instruction from the data processing unit 12. Note that in this embodiment, the data storage unit 13 sequentially stores the sensor data acquired by the sensor unit 11.

The encryption unit 14 collectively encrypts the sensor data aggregated with a predetermined number of frame aggregations by the data processing unit 12. For example, the encryption unit 14 collectively hashes the sensor data aggregated with a predetermined number of frame aggregations to generate a hash value composed of numerical values of predetermined digits. Note that although in this embodiment, the encryption is performed using hash, the encryption may be performed by other methods.

The registration unit 15 associates the sensor data (hash value) encrypted (hashed) by the encryption unit 14 with the acquisition date and the ID and registers it as a transaction on the BC network. Note that the sensor data (transaction) registered on the BC network is managed in each sensor device 1 connected to the BC network in a distributed manner.

Aggregation Method of Sensor Data

As described above, the BC network normally assumes data (several-second intervals at the fastest) relating to human transactions. It took a certain registration requirement time (e.g., 3.7 seconds on average) until the completion of data transaction registration.

In contrast, the sensor data in the sensor network infrastructure is stream data in a video format or the like. When it is attempted to register the sensor data on a frame-by-frame basis on the BC network, the registration intervals will be on the order of milliseconds.

For this reason, in the case of a BC network, it requires a predetermined amount of time (e.g., 3.7 seconds on average) to register the sensor data for one registration. For this reason, if it is attempted to frequently register sensor data on a frame-by-frame basis, the BC network overflows. In order to avoid the overflow, it is conceivable to register one frame of the sensor data for each predetermined registration requirement time (for example, 3.7 seconds on average). However, in this case, there is a problem that significant data loss occurs.

Therefore, in the present invention, the data processing unit 12 aggregates the sensor data acquired by the sensor unit 11 with a predetermined number of frame aggregations. Then, the encryption unit 14 collectively encrypts the sensor data aggregated by data processing unit 12 with a predetermined number of frame aggregations. Then, the registration unit 15 registers the sensor data (hash value) encrypted (hashed) by the encryption unit 14 as a transaction on the BC network.

At this time, the data processing unit 12 can reliably prevent the occurrence of overflow when registering the sensor data by aggregating the sensor data with the number of frame aggregations satisfying the following Formula [1].

$$T_F \times N > T \qquad [1]$$

Figure 3:
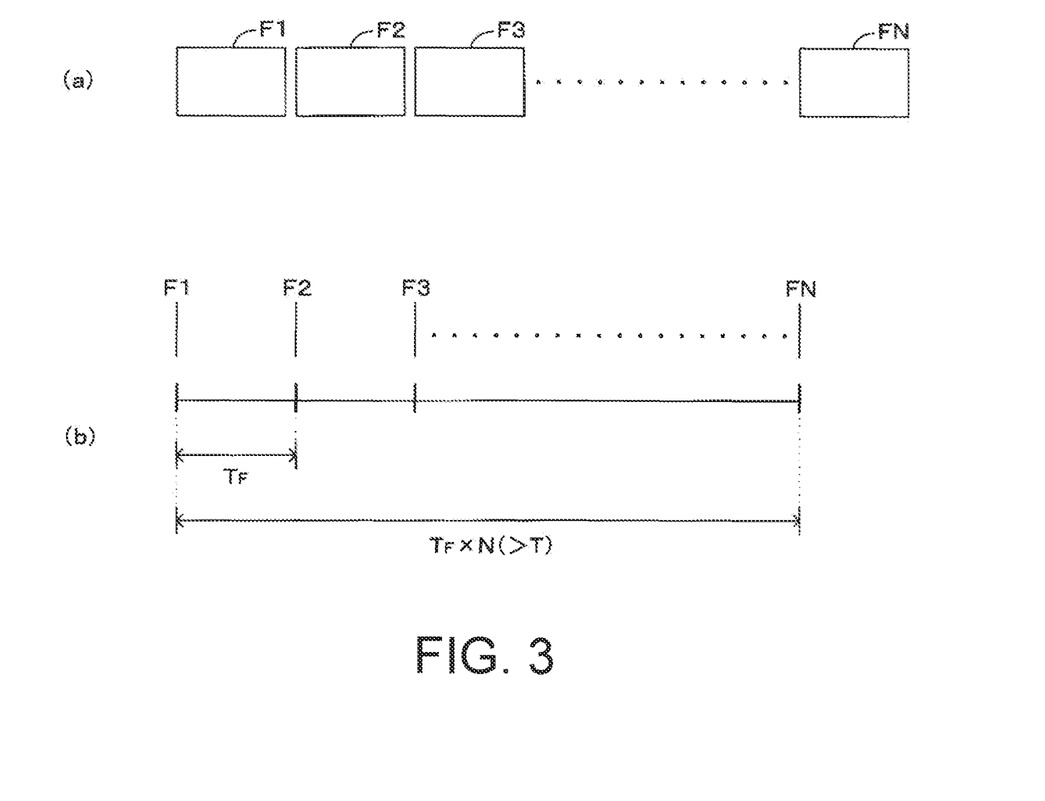
FIG. 3 is a conceptual diagram for explaining the frame aggregation of sensor data.

$T_F$: Frame intervals of sensor data
N: Number of frame aggregations
T: Registration requirement time of sensor data in the blockchain network system For example, as shown in FIG. 3, in a case where the frame interval $T_F$ of the sensor data is 50 ms and the registration requirement time T of the sensor data in the BC network system is 3.7 seconds on average, and the number of frame aggregations N is 74 or more, the above-described Formula [1] is satisfied. Therefore, it is possible to reliably prevent overflow when registering the sensor data.

Further, when encrypting the sensor data for the encryption unit 14, the data processing unit 12 encrypts the sensor data sequentially acquired by the sensor unit 11 on a frame-by-frame basis and then collectively encrypts each encrypted sensor data with a predetermined number of frame aggregations.

The registration requirement time of the sensor data in the BC network system is expressed by, for example, the following Formula [3].

$$T = (N+1) \times T_h + T_{CA} + T_{TX} + T_O + T_{pm} \qquad [3]$$

$T_h$: Hashing time
$T_{CA}$: CA (Certification Authority) processing time
$T_{TX}$: Verification time of transaction
$T_O$: Time for ordering the transaction by an Orderer
$T_{pm}$: Worst value of peer processing time In the above-described Formula [3], (N+1)×$T_h$ in the first term of the right side of the Formula represents the total time for hashing the sensor data, which is a negligibly short time of about 0.4 seconds. The encryption unit 14 encrypts N frames of sensor data on a frame-by-frame basis and then collectively encrypts each encrypted sensor data in a state in which N pieces of sensor data are aggregated, and therefore, the hashing time T is multiplied by the number of encryptions (N+1). On the other hand, $T_{CA}+T_{TX}+T_O+T_{pm}$ in the second term and thereafter of the right side of the Formula is the time required to register the encrypted sensor data in the BC network, which takes a long time of 3.7 seconds on average.

Flow of Registration of Sensor Data

Figure 4:
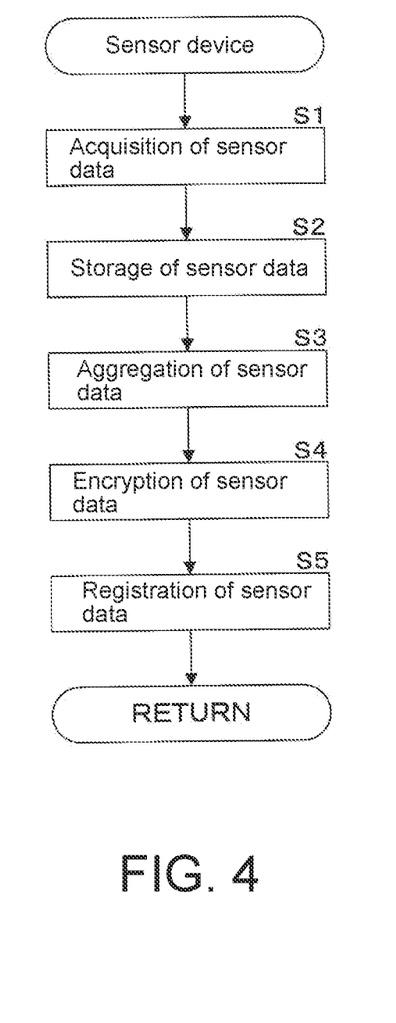
FIG. 4 is a flowchart showing a flow of sensor data registration.

Next, a flow of registration of sensor data in this system will be described with reference to FIG. 4.

First, the sensor unit 11 sequentially acquires the sensor data, such as, e.g., image data in real space, at predetermined intervals (e.g., 50 ms) on a frame-by-frame basis (S1).

Then, the data processing unit 12 makes the data storage unit 13 store the sensor data acquired by the sensor unit 11 (S2). Further, the data processing unit 12 aggregates the sensor data acquired by the sensor unit 11 with a predetermined number of frame aggregations (S3).

Then, the encryption unit 14 collectively encrypts the sensor data aggregated by the data processing unit 12 with a predetermined number of frame aggregations (S4).

Then, the registration unit 15 registers the sensor data (hash value) encrypted (hashed) by the encryption unit 14 as a transaction on the BC network (S5).

Second Embodiment

Next, a second embodiment of this system will be described with reference to FIG. 5 to FIG. 8.

Overall Configuration

Figure 5:
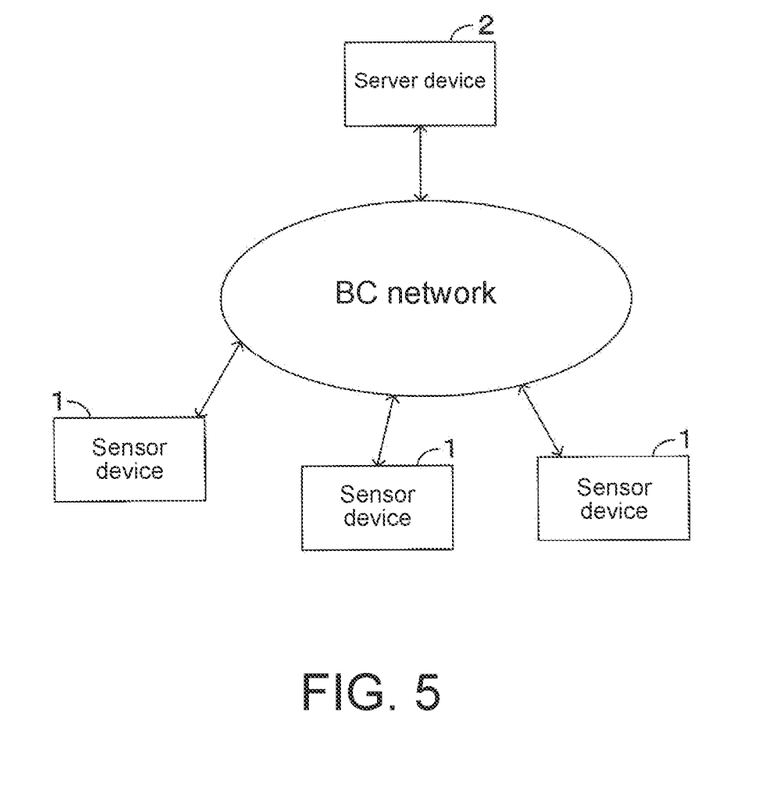
FIG. 5 is a schematic configuration diagram of a blockchain network system according to a second embodiment.

As shown in FIG. 5, in this system, a server device 2 and a plurality of sensor devices 1 are connected with each other via a BC network in a communicable manner, and the sensor data acquired by the sensor device 1 is managed on the BC network in a distributed manner.

Sensor Device 1

Figure 6:
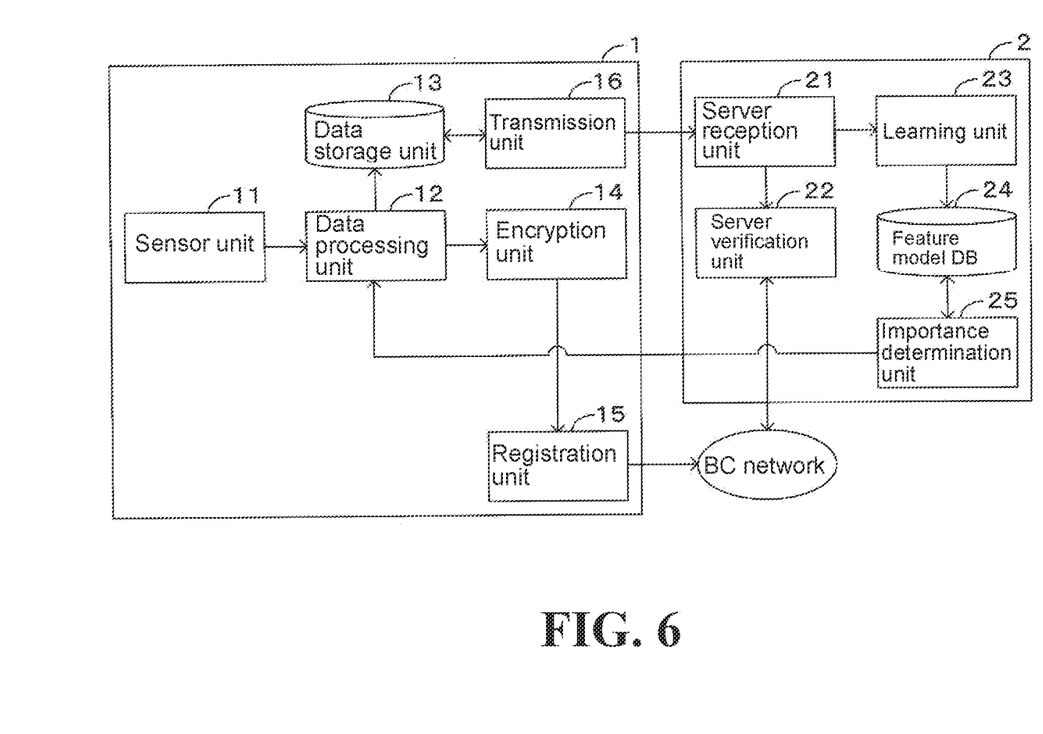
FIG. 6 is a block diagram showing configurations of a sensor device and a server device shown in FIG. 5.

As shown in FIG. 6, the sensor device 1 is provided with a sensor unit 11 for acquiring sensor data in real space, a data processing unit 12 for processing sensor data, a data storage unit 13 for storing sensor data, an encryption unit 14 for encrypting sensor data, a registration unit 15 for registering sensor data on a BC network, and a transmission unit 16 for transmitting sensor data to the server device 2. Note that the sensor unit 11, the data storage unit 13, the encryption unit 14, and the registration unit 15 are the same as those of the first embodiment, and therefore, the descriptions thereof will be omitted.

The data processing unit 12 stores the sensor data acquired by the sensor unit 11 in the data storage unit 13 and aggregates the sensor data acquired by the sensor unit 11 with a predetermined number of frame aggregations. The aggregation method of the sensor data according to this embodiment will be described later.

The transmission unit 16 transmits the sensor data stored in the data storage unit 13 to the server device 2. When transmitting the sensor data, in order to improve the real-time performance, the sensor data stored in the storage unit 13 may be sequentially transmitted, or Server Device 2

The server device 2 is provided with a server reception unit 21 for receiving the sensor data transmitted from each sensor device 1 via the network, a server verification unit 22 for verifying the sensor data, a learning unit 23 for generating a feature model of the sensor data, a feature model database (hereinafter referred to as "feature model DB 24") for storing the feature model of the sensor data, and an importance determination unit 25 for determining the importance of the sensor data.

The server verification unit 22 verifies the sensor data received by the server reception unit 21 by referring to the BC network. Specifically, the server verification unit 22 encrypts (hashes) the sensor data received by the server reception unit 21 with a predetermined number of frame aggregations (the same number as the number of frame aggregations in the data processing unit 12 of the sensor device 1) to generate a hash value composed of a numerical value of predetermined digits and verifies the hash value by comparing the hash value with the hash value of the sensor data managed on the BC network. This hash value has the property of becoming a quite different value when hashing slightly different character string data. Therefore, in a case where sensor data received by the server reception unit 21 has been tampered, the hash value on the server verification unit 22 and the hash value on the BC network become completely different values. For this reason, the data tampering can be easily found.

In a case where it is verified in the server verification unit 22 that the sensor data is proper (not tampered), the learning unit 23 generates a feature model (ML model) based on the sensor data received by the server reception unit 21. This feature model is generated by subjecting the successively accumulated sensor data to machine learning. For example, it is known that vehicles and pedestrians generally move as a group in a case where sensor data is image data of intersections, roads, or the like. The learning unit 23 accumulates the sensor data and generates a group move pattern as a feature model by machine learning.

The feature model DB 24 stores feature models of the sensor data generated by the learning unit 23 and is sequentially updated.

The importance determination unit 25 determines the importance of the sensor data based on the feature model generated by the learning unit 23 after completion of the verification of the sensor data of the predetermined number of frame aggregations in the server verification unit 22. Specifically, the importance determination unit 25 determines, for each sensor data received by the server reception unit 21, the importance of each sensor data by referring to the feature models of the sensor data stored in the feature model DB 24.

Figure 7:
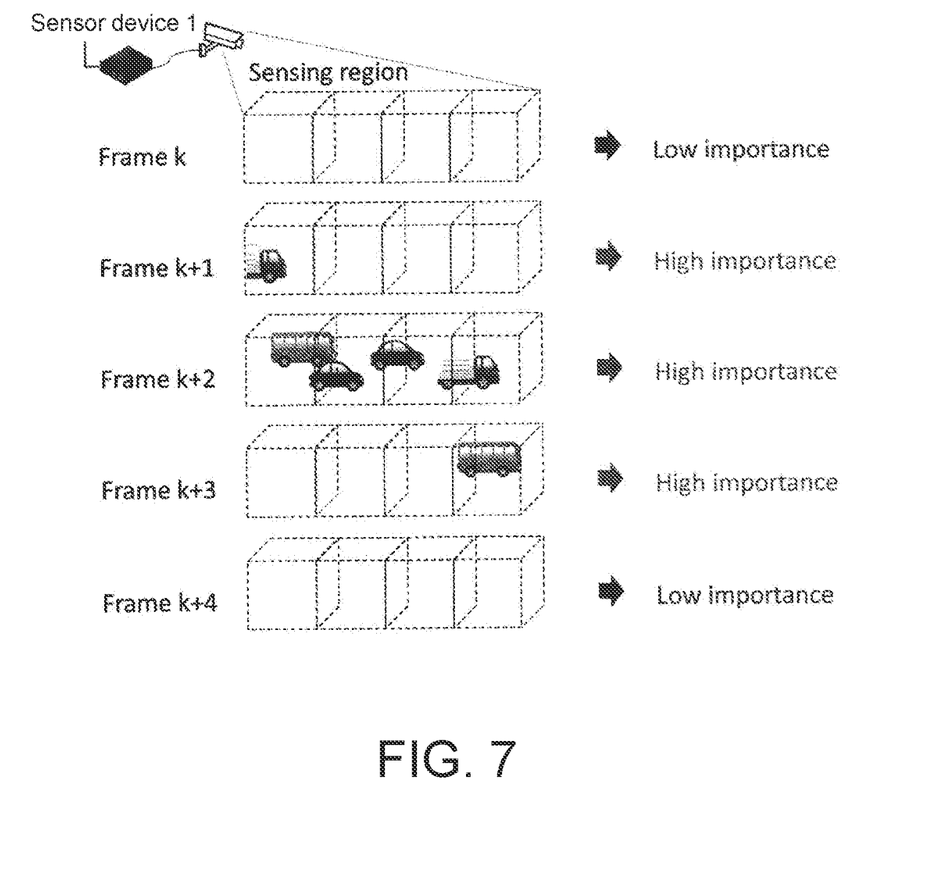
FIG. 7 is a conceptual diagram for explaining the importance of sensor data.

For example, as shown in FIG. 7, in a case where the sensor data is image data of an intersection and a street, a feature model is generated by accumulating past image data, and when vehicles and/or pedestrians continuously appear, it is assumed that machine learning is being performed that the likelihood of an accident increases. At this time, when vehicles or pedestrians do not appear in a certain frame (Frame k) of the sensor data, it is evaluated that the sensor frame k of such a frame is low in importance. In a case where a vehicle or a pedestrian is likely to continuously appear in a certain frame of the sensor data (Frame k+1), it is evaluated such that the sensor data of each frame (Frame k+1, Frame k+2, Frame k+3) followed by the vehicles or the pedestrians is high in importance. Again, in a case where no vehicle or pedestrian appear in a certain frame of the sensor data (Frame k+4), it is evaluated such that the sensor data of such a frame is low in importance. The importance of these sensor data is transmitted to the sensor device 1 and used by the data processing unit 12 of the sensor device 1 to aggregate frames. Note that the importance of this sensor data may be quantified.

Note that it may be configured such that the importance determination unit 25 enhances the real-time performance by determining the importance of the sensor data before completing the verification of the sensor data with a predetermined number of frame aggregations in the server verification unit 22.

Aggregation Method of Sensor Data

The data processing unit 12 sets the sensor data to a predetermined number of frame aggregations based on the importance of the sensor data determined by the importance determination unit 25 of the server device 2, for the sensor data sequentially acquired by the sensor unit 11.

Specifically, the data processing unit 12 sets, for the sensor data sequentially acquired by the sensor unit 11, the number of aggregation frames of the sensor data with high importance to be small and the number of aggregation frames of the sensor data with low importance to be large, based on the importance of the sensor data determined by the importance determination unit 25 of the server device 2.

For example, in a case where the frame interval of the sensor data is 50 ms and the registration requirement time T of the sensor data of the BC network is 3.7 seconds, when the data processing unit 12 aggregates the sensor data with the number of frame aggregations of 74 or more, no overflow occurs when registering the sensor data in the BC network. However, in this case, 74 or more pieces of sensor data are required when handling the sensor data, which may lead to a lack of real-time performance.

Therefore, when the number of frame aggregations of the sensor data with high importance is 20, and the number of frame aggregations of the sensor data with low importance is 100, the data processing unit 12 requires only 20 pieces of sensor data for at least the sensor data with high importance when handling these sensor data. Therefore, the real-time performance can be improved.

At this time, it is preferable that the data processing unit 12 aggregate the sensor data with the number of frame aggregations satisfying the following Formulas [1] and [2].

$$T_F \times N > T \quad [1]$$

$T_F$: Frame interval of sensor data
N: Number of frame aggregations
T: Registration requirement time of sensor data in the BC network system $$N = N_H \times W_H + N_L \times W_L \quad [2]$$

N: Average value of the number of frame aggregations
$N_H$: Number of frame aggregations of sensor data with high importance
$W_H$: Ratio of sensor data with high importance to all sensor data
$N_L$: Number of frame aggregations of sensor data with low importance
$W_L$: Ratio of sensor data with low importance to all sensor data For example, it is assumed that the number of frame aggregations $N_H$ of the sensor data with high importance is 20, the ratio $W_H$ of the sensor with high importance to all sensor data is 1/4, the number of frame aggregations $N_L$ of the sensor data with low importance is 100, and the rate $W_L$ of the sensor data with low importance to all sensor data is 3/4. In this situation, the average value of the number of frame aggregations is 80, which is higher than the number of frame aggregations of 74 satisfying the registration requirement time T (3.4 seconds on average), which can prevent overflow.

Flow of Importance Determination of Sensor Data

Figure 8:
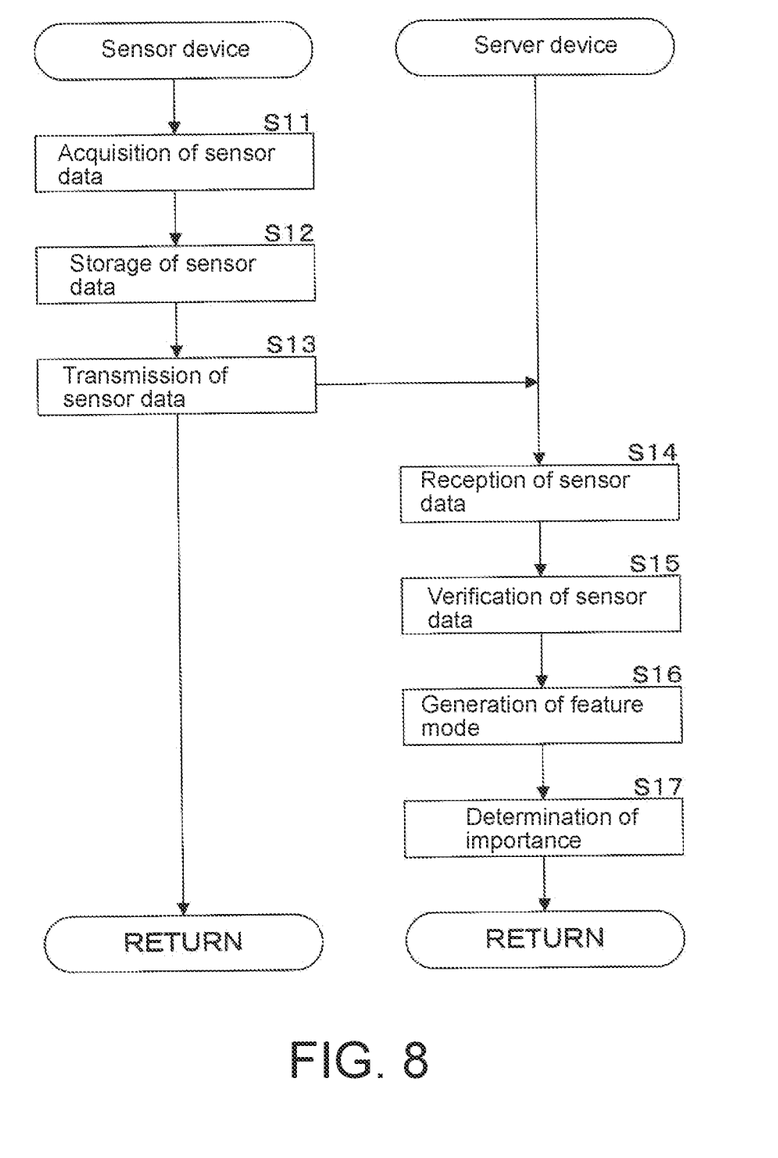
FIG. 8 is a flowchart showing a flow of the importance determination of sensor data.

Next, a flow of importance determination of sensor data in this system will be described with reference to FIG. 8.

First, in the sensor device 1, the sensor unit 11 sequentially acquires sensor data, such as, e.g., image data in real space, at predetermined intervals (e.g., 50 ms) on a frame-by-frame basis (S11).

Then, the data processing unit 12 makes the data storage unit 13 store the sensor data acquired by the sensor unit 11 (S12).

Then, the transmission unit 16 transmits the sensor data stored in the data storage unit 13 to the server device 2 (S13).

Next, in the server device 2, the server reception unit 21 receives the sensor data transmitted from the sensor device 1 via the network (S14).

The server verification unit 22 verifies the sensor data received by the server reception unit 21 by referring to the BC network.

In a case where it is verified in the server verification unit 22 that the sensor data is appropriate (not tampered), the learning unit 23 generates a feature model based on the sensor data received by the server reception unit 21 (S16).

Then, the importance determination unit 25 determines the importance of the sensor data based on the feature model generated by the learning unit 23 after completing the verification of the sensor data of the predetermined number of frame aggregations in the server verification unit 22 (S17). The importance of the sensor data is transmitted from the server device 2 to the sensor device 1 and is used in the sensor device 1 to set the number of frame aggregations.

Note that the flow of the registration of the sensor data is the same as that of the first embodiment, and therefore, the explanation thereof will be omitted.

Third Embodiment

Figure 10:
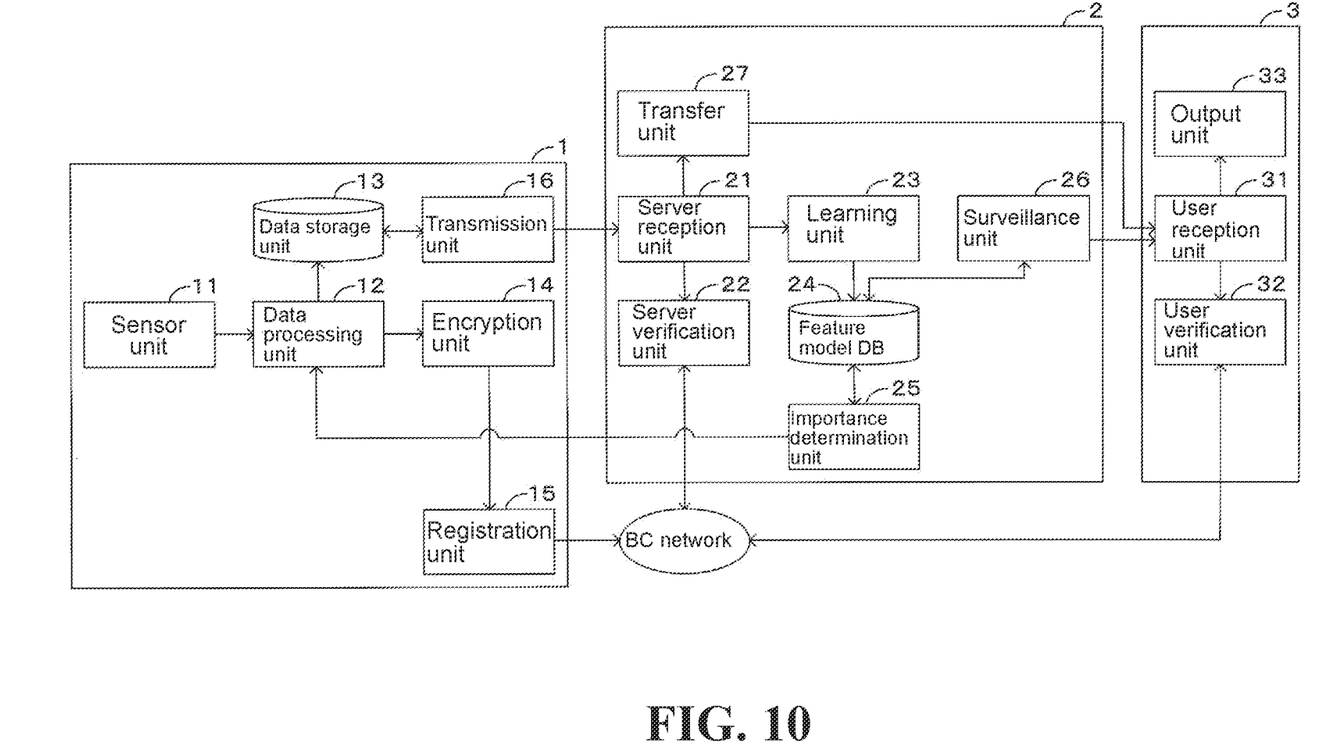
FIG. 10 is a block diagram showing configurations of a sensor device, a server device, and a user terminal device shown in FIG. 9.
Figure 11:
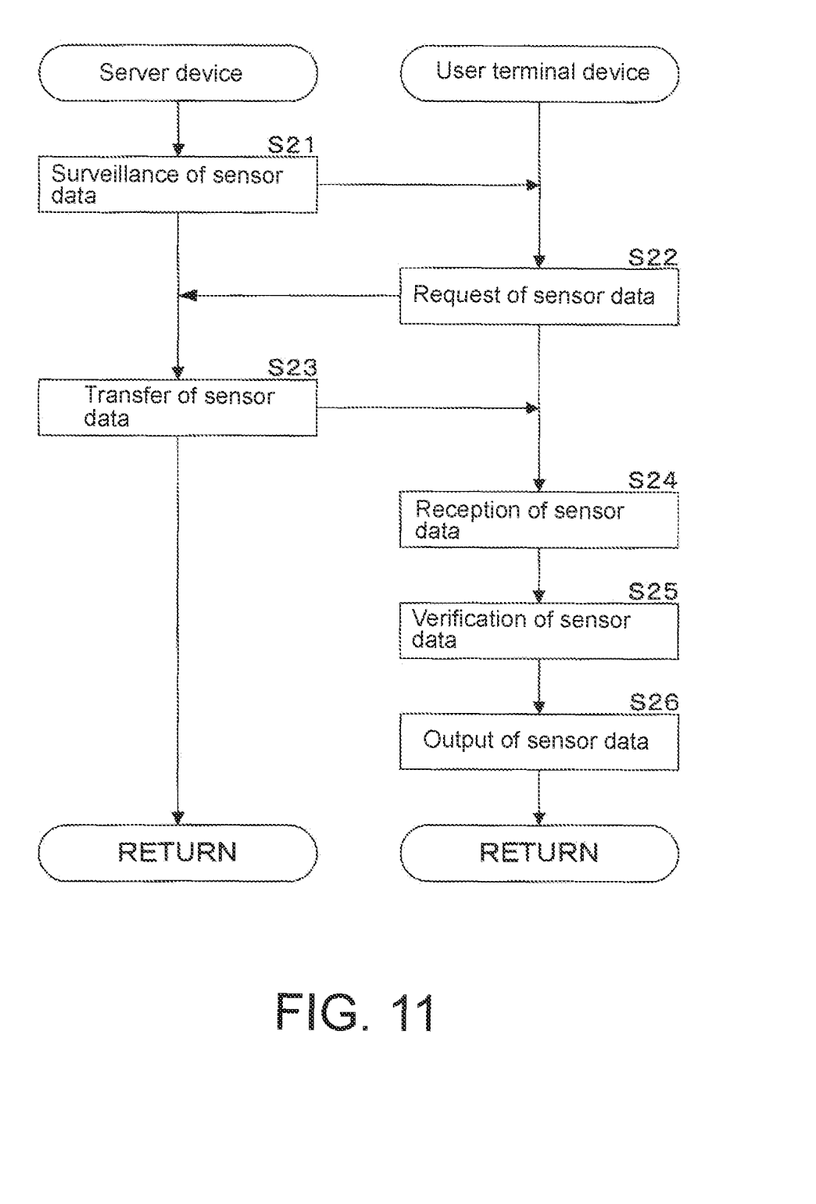
FIG. 11 is a flowchart showing a flow of sensor data surveillance and output.

Next, a third embodiment of this system will be described with reference to FIG. 9 to FIG. 11.

Overall Configuration

Figure 9:
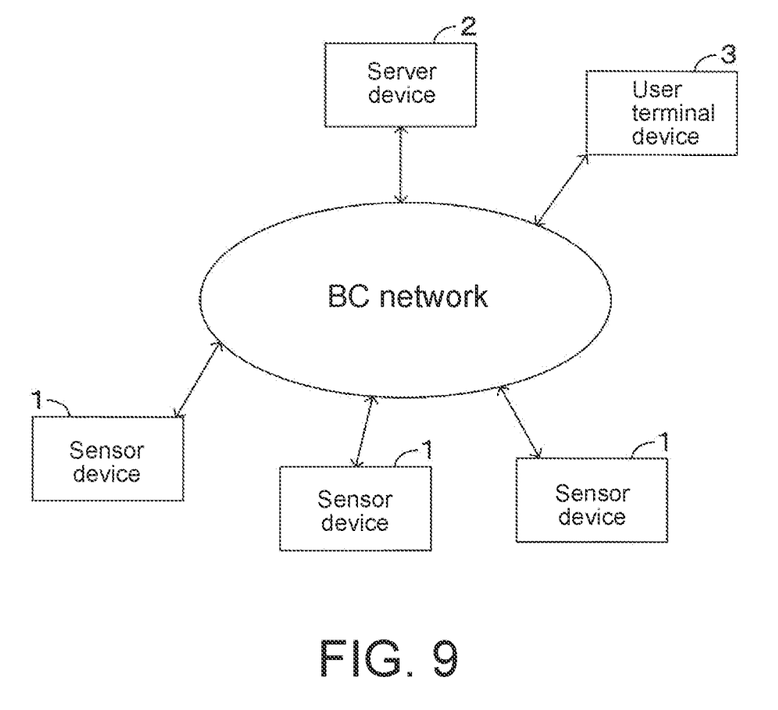
FIG. 9 is a schematic configuration diagram of a blockchain network system according to a third embodiment.

As shown in FIG. 9, in this system, a server device 2, a user terminal device 3, and a plurality of sensor devices 1 are connected with each other via a BC network in a communicable manner, and the sensor data acquired by the sensor devices 1 is managed in a distributed manner on the BC network. Since the sensor device 1 has the same configuration as that of the second embodiment, the explanation thereof will be omitted.

Server Device 2

The server device 2 is provided with a server reception unit 21 for receiving sensor data transmitted from each sensor device 1 via the network, a server verification unit 22 for verifying the sensor data, a learning unit 23 for generating a feature model of the sensor data, a feature model DB 24 for accumulating the feature model of the sensor data, an importance determination unit 25 for determining the importance of the sensor data, a surveillance unit 26 for surveilling the sensor data, and a transfer unit 27 for transferring the sensor data to the user terminal device 3. Note that the server reception unit 21, the server verification unit 22, the learning unit 23, the feature model DB 24, and the importance determination unit 25 are the same as those of the second embodiment, and therefore the explanation thereof will be omitted.

The surveillance unit 26 surveils the sensor data received by the server reception unit 21 based on the feature model generated by the learning unit 23. When a predetermined abnormality or change is detected in the sensor data received by the server reception unit 21, the surveillance unit 26 notifies the user terminal device 3 of the predetermined abnormality or change.

In response to a request from the user terminal device 3, the transfer unit 27 forwards the sensor data received by the server reception unit 21 to the user terminal device 3.

User Terminal Device 3

The user information terminal is provided with a user reception unit 31 for receiving sensor data transmitted from the server device 2, a user verification unit 32 for verifying the sensor data received by the user reception unit 31, and an output unit 33 for outputting the sensor data.

In a case where a predetermined abnormality or change is notified from the surveillance unit 26 of the server device 2, the user reception unit 31 requests sensor data to the server device 2 to receive sensor data transmitted from the server device 2.

The user verification unit 32 verifies the sensor data received by the user reception unit 31 by referring to the BC network. The verification method of the sensor data is the same as that of the server verification unit 22 of the second embodiment, and therefore, the explanation thereof will be omitted.

In a case where it is verified in the user verification unit 32 that the sensor data is appropriate (not tampered), the output unit 33 outputs the sensor data received by the user reception unit 31 in the form of an alert or the like.

At this time, in a case where in the sensor device 1, it is set such that the number of frame aggregations of the sensor data with high importance is set to be small based on the importance of the sensor data, in the user terminal device 3, the verification can be performed with a smaller number of frame aggregations for the sensor data with high importance. Therefore, the sensor data with high importance can be handled in real time.

It should be noted that although it takes a registration requirement time (for example, 3.7 seconds on average) to register the sensor data with high importance in the sensor device 1, it takes a certain amount of time for the sensor data with high importance to reach the user terminal device 3 from the sensor device 1 via the server device 2. Therefore, when the sensor data with high importance has reached the user terminal device 3, it is in a state in which it is ready or almost ready to verify the sensor data in the user terminal device 3 because it is in a state in which the registration requirement time has elapsed or it is immediately before the elapse of the registration requirement time.

Flow of Surveillance/Outputting of Sensor Data

Next, a flow of surveillance/outputting of sensor data in this system will be described with reference to FIG. 11.

First, in the server device 2, the surveillance unit 26 surveils the sensor data received by the server reception unit 21, based on the feature model generated by the learning unit 23. When a predetermined abnormality or change is detected in the sensor data received by the server reception unit 21, the surveillance unit 26 notifies the user terminal device 3 of a predetermined abnormality or change (S21).

Next, in the user terminal device 3, when a predetermined abnormality or change is notified from the surveillance unit 26 of the server device 2, the user reception unit 31 requests the sensor data to the server device 2 (S22).

Next, in the server device 2, the transfer unit 27 transfers the sensor data received by the server reception unit 21 to the user terminal device 3 in response to the request from the user terminal device 3 (S23).

Next, in the user terminal device 3, the user reception unit 31 receives the sensor data transmitted from the server device 2 (S24).

The user verification unit 32 verifies the sensor data received by the user reception unit 31 by referring to the BC network (S25).

Then, in a case where it is verified in the user verification unit 32 that the sensor data is appropriate (not tampered), the output unit 33 outputs the sensor data received by the user reception unit 31 in the form of an alert or the like.

Note that the flow of the registration of the sensor data and the flow of the determination of the importance of the sensor data are the same as those of the first embodiment and the second embodiment, and therefore the explanation thereof will be omitted.

Example 1

As Example 1, in the sensor device 1 and the server device 2, in a case where a situation at an intersection is surveilled and a pattern in which an accident is likely to occur is detected by machine learning, it is considered that the server device 2 notifies the user terminal device 3 of a smart-monitoring supervisor, and the sensor data (image data) at the intersection is outputted in the terminal device 3.

In a case where the present invention is not used, it takes 3.7 seconds to register the sensor data in the sensor device 1 to the BC network, and therefore, there is a possibility of data loss of the sensor data to be registered in the BC network or data overflow, resulting in a failure of the registration.

With the present invention, when it is aggregated such that the frame interval $T_F$ of the sensor data is at 50 ms (frame Rate 20 fps), the number of frame aggregations is 74 or larger, neither data loss nor overflow will occur.

However, in this case, in the server device 2 or the user terminal device 3, verification cannot be performed unless sensor data with the number of frames of 74 or more, which are the same as those of the number of frame aggregations, is received. Therefore, the number of frame aggregations of the sensor data with high importance is set to be small. For example, when the number of frame aggregations is set to 20, the server device 2 and the user terminal device 3 can handle the sensor data every second.

Note that even at this time, by setting the frame numbers of sensor data with low importance to be large (for example, $N_L=100$), the number of frame aggregations can be aggregated at 74 or more on average. Therefore, it is possible to prevent the overflow of the entire sensor data while ensuring the real-time performance of sensor data.

Example 2

As Example 2, it is conceivable that, in the sensor device 1 and the server device 2, in a case where the situation at an intersection is surveilled and a pattern in which an accident is likely to occur is detected by machine learning, it is conceivable that the server device 2 notifies the vehicle (user terminal device 3) to output an alert of the intersection in the vehicle (user terminal device 3).

Example 3

As Example 3, in the sensor device 1 and the server device 2, in a case where it is detected that a large number of pedestrians come out from indoors in a place where public transportation is not available nearby, it is considered that the server device 2 notifies the fact of the smart dispatch system (user terminal device 3), and the smart dispatch system notifies the respective taxis so that the taxis traveling in the vicinity of the place is predictably directed to the place.

Example 4

As Example 4, in the sensor device 1 and the server device 2, in indoors, such as, e.g., shopping malls and museums, in a case where a suspicious person whose motion pattern is unnatural is detected by machine learning, it is considered to notify the smart monitoring system (user terminal device 3) from the server device 2, so that the security guard may predictably speak to the suspicious person, or the smart monitoring may track the motion of the suspicious person.

Although the embodiments of the present invention have been described above with reference to the attached drawings, the present invention is not limited to the illustrated embodiments. It should be understood that various modifications and variations can be made to the illustrated embodiments within the same or equivalent scope of the present invention.

DESCRIPTION OF SYMBOLS

1: Sensor device
11: Sensor unit
12: Data processing unit
13: Data storage unit
14: Encryption unit
15: Registration unit
16: Transmission unit
2: Server device
21: Server reception unit
22: Server verification unit
23: Learning unit
24: Feature model DB
25: Importance determination unit
26: Surveillance unit
27: Transfer unit
3: User terminal device
31: User reception unit
32: User verification unit
33: Output unit

The invention claimed is:

1. A blockchain network system comprising:
a plurality of sensor devices; and
a blockchain network,
wherein the plurality of sensor devices are connected with each other via the blockchain network in a communicable manner, and sensor data acquired by the plurality of sensor devices are managed on the blockchain network in a distributed manner,
wherein each of the plurality of sensor devices include:
at least one processor configured to
sequentially acquire sensor data in real space on a frame-by-frame basis;
process the sensor data acquired by the plurality of sensor devices;
store the sensor data;
encrypt the sensor data obtained by the plurality of sensor devices; and
register the sensor data encrypted on the blockchain network,
wherein the at least one processor aggregates the sensor data acquired by the sensor device with a predetermined number of frame aggregations, and
wherein the at least one processor collectively encrypts the sensor data aggregated by the at least one processor with the predetermined number of frame aggregations.

2. The blockchain network system as recited claim 1, wherein the at least one processor is configured to encrypt the sensor data acquired by the sensor device on a frame-by-frame basis and then collectively encrypts the encrypted sensor data with the predetermined number of frame aggregations.

3. The blockchain network system as recited in claim 1, wherein the at least one processor is configured to aggregate the sensor data with a number of frame aggregations satisfying a following Formula [1]:

$$TF \times N > T \qquad [1]$$

TF: Frame interval of sensor data
N: Number of frame aggregations
T: Registration requirement time of sensor data in the blockchain network system.

4. The blockchain network system as recited in claim 1, further comprising:
a server device connected to the blockchain network in a communicable manner,
wherein the server device is configured to:
receive the sensor data transmitted from each of the plurality of sensor devices via the blockchain network;
generate a feature model of the sensor data based on the sensor data received by the server reception unit; and
to determine importance of the sensor data, based on the feature model generated by the learning unit,
wherein in the sensor device, the at least one processor is configured to set a predetermined number of frame aggregations of the sensor data, based on the importance of the sensor data determined by the server device, for the sensor data acquired by the sensor device.

5. The blockchain network system as recited in claim 4, wherein the at least one processor is configured to set the number of frame aggregations of the sensor data with high importance to be small and sets the number of frame aggregations of the sensor data with low importance to be large, based on the importance of the sensor data determined by the server device, for the sensor data acquired by the sensor device.

6. The blockchain network system as recited in claim 5, wherein the at least one processor is configured to aggregate the sensor data by an average value of the number of frame aggregations represented by a following Formula [2]:

$$N = NH \times WH + NL \times WL \qquad [2]$$

N: Average value of the number of frame aggregations;
NH: Number of frame aggregations of sensor data with high importance;
WH: Ratio of sensor data with high importance to all sensor data;
NL: Number of frame aggregations of sensor data with low importance; and
WL: Rate of sensor data with low importance to all sensor data.

7. The blockchain network system as recited in claim 4, wherein the server device is configured to verify the sensor data by referring to the blockchain network for each number of frame aggregations, and wherein generating a feature model of the sensor data based on the sensor data in a case where the sensor data are verified by the server that the sensor data are appropriate.

8. The blockchain network system as recited in claim 4, further comprising:
a user terminal device connected to the blockchain network,
wherein the user terminal device is figured to:
  receive sensor data transmitted from the server device;
  verify the sensor data received by referring to the blockchain network for each number of frame aggregations; and
  output the sensor data in a case where the sensor data are verified that the sensor data are appropriate.

9. The blockchain network system as recited in claim 8,
wherein the server device is configured for surveilling the sensor data based on the feature model, and
wherein the server device is configured to notify the user terminal device of a predetermined abnormality or change in a case where the predetermined abnormality or change is detected in the sensor data received.

* * * * *